M. S. SWARTZENDRUBER.
CURB BIT.
APPLICATION FILED MAY 6, 1909.
988,836.
Patented Apr. 4, 1911.
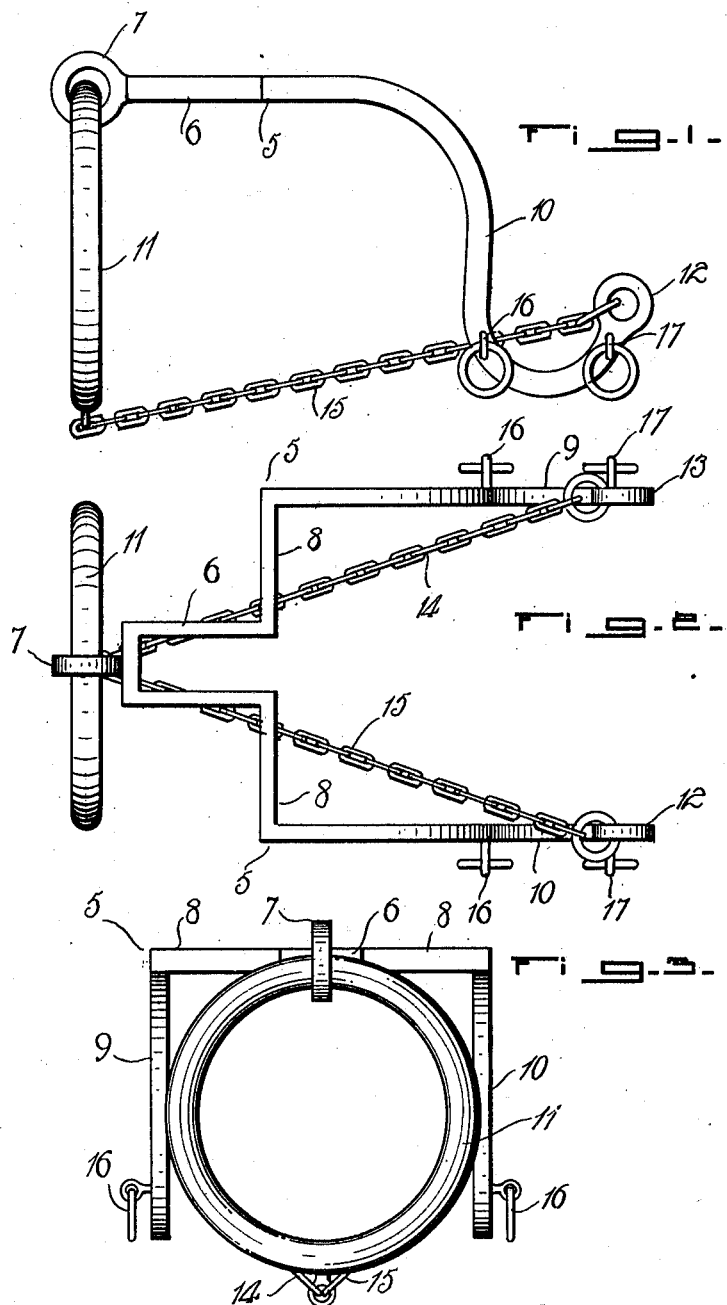
Inventor
Menno S. Swartzendruber.
Witnesses
C. E. Chandler.
John A. Donegan,
By
Chandler Chandler
Attorney

UNITED STATES PATENT OFFICE.

MENNO S. SWARTZENDRUBER, OF DORCHESTER, NEBRASKA.

CURB-BIT.

988,836.  Specification of Letters Patent. Patented Apr. 4, 1911.

Application filed May 6, 1909. Serial No. 494,278.

*To all whom it may concern:*

Be it known that I, MENNO S. SWARTZENDRUBER, a citizen of the United States, residing at Dorchester, in the county of Saline, State of Nebraska, have invented certain new and useful Improvements in Curb-Bits; and I do hereby declare the following to be a full, clear, and exact description of the invention, such as will enable others skilled in the art to which it appertains to make and use the same.

This invention relates to improvements in bridle bits and more particularly to the curb type.

One object of the invention is the provision of an improved device of that kind which will so bind on the animal's jaw and mouth as to positively prevent any tendency to bolt.

The device consists essentially in a bit having a medially disposed loop or tongue which is designed to bind in the animal's mouth and having combined therewith a ring which is adapted to tightly bind on the animal's jaw when the reins are pulled by the driver.

With the above and other objects in view the invention consists in certain constructions, combinations and arrangements of parts, fully described in the following specification and clearly illustrated in the accompanying drawings.

In the accompanying drawings forming part of the specification:—Figure 1 is a side elevation of the device. Fig. 2 is a plan view of the same. Fig. 3 is a rear end view.

Similar numerals of reference are employed to designate corresponding parts throughout.

The bit bar is designated in general by the numeral 5 and is shown to consist of a single piece of metal, the intermediate portion of which is formed into a loop 6, the outer end of the latter terminating in an eye 7. The loop 6 is designed to be inserted into the animal's mouth and the horizontal portions 8 at the terminals of the loop constitute the bit bar proper. These extensions are of a length to extend beyond the opposite sides of the animal's mouth and terminate in downwardly and forwardly substantially S shaped extensions 9 and 10.

Disposed in the eye 7 is a ring 11 the diameter of which is sufficient to receive the lower jaw of the animal. The free terminals of the S shaped extensions are provided with eyes 12 and 13 and connection between the terminals and ring is established by means of flexible chain elements 14 and 15, the latter being of a length sufficient to permit the ring to move outwardly far enough to assume a perpendicular position with respect to the loop 6. Suitable eyes 16 and 17 are formed on the S shaped extensions and project laterally from the sides thereof, these eyes serving to receive the forward ends of the driving reins. The eyes 16 are located near the middle of the said extensions 9 and 10 and the eyes 17 are located near the terminals of said extensions.

The preferred construction now having been set forth the operation will now be described:—When the device is to be applied to a horse, the lower jaw of the animal is inserted into the ring 11, and the latter brought to the rear of the animal's mouth carrying with it the loop 6 and horizontal portions 8. In this position it will be seen that the loop 6 and horizontal portions 8 will extend in advance of the ring for a considerable distance but not sufficiently far to permit the animal to engage the horizontal portions 8 between his teeth. The S shaped extensions will now be on the opposite sides of the animal's mouth and the reins will be secured in the eyes 16. During driving should the animal attempt to bolt, simply pulling on the reins engaged in the eyes 16 will cause the S shaped extensions to descend, whereby the loop 6 will ascend in the animal's mouth carrying with it the ring 11. The latter will bind against the animal's jaw sufficiently hard to cause intense pain and the pull on the extensions will cause the horizontal portions 8 to bind in the corners of the animal's mouth which will increase the pain and cause the animal to bring his head to an erect position.

In exceptional cases such as when it is found that the animal's mouth and jaw are exceedingly tough an extra set of reins are secured in the eyes 17 adjacent the terminals of the S shaped extensions. It will be seen when the reins engaged in these eyes 17 are pulled that excessive turning movement will be imparted to the device causing the loop and ring to ascend farther and bind harder on the animal's mouth and jaw.

Thus it will be seen that I have provided a device which is exceedingly simple in structure and comparatively inexpensive to manufacture and which will perform its function in an efficient manner. It will be further observed that the disposition of the parts is so arranged that the danger of derangement will be reduced to a minimum and that the severest cases of bolting can be successfully overcome.

Having thus described my invention what is claimed as new, is:—

In a curb bit, a pair of side bars having integral horizontal portions and integral with a longitudinally extending loop portion adapted to be received in the mouth of an animal, an eye formed on the terminal of the loop portion, a link pivoted to the eye and adapted to embrace the lower jaw of an animal, the side bars being curved downwardly of the loop portion and having their ends curved upwardly and formed with eyes disposed in planes considerably lower than the plane of said loop portion, the curves of the ends of the side bars being opposite the curves of the upper portions of said side bars, chains pivotally connected with the eyes of the side bar ends and pivotally connected with the lower portion of the ring, rings pivotally secured to the terminals of the side bars on opposite sides thereof and rings secured to said side bars rearwardly of the first rings.

In testimony whereof, I affix my signature, in presence of two witnesses.

MENNO S. SWARTZENDRUBER.

Witnesses:
 WM. E. NELSON,
 W. F. NELSON.

---

Copies of this patent may be obtained for five cents each, by addressing the "Commissioner of Patents, Washington, D. C."